United States Patent [19]
Hartal

[11] Patent Number: 5,459,468
[45] Date of Patent: Oct. 17, 1995

[54] PULSING RADAR REFLECTOR

[75] Inventor: Oren Hartal, Kiryat, Israel

[73] Assignee: State of Isreal-Ministry of Defense, Armament Development Authority-Rafael, Haifa, Israel

[21] Appl. No.: 246,446

[22] Filed: May 20, 1994

[30] Foreign Application Priority Data

May 21, 1993 [IL] Israel ......................................... 105766

[51] Int. Cl.$^6$ ..................................................... H01Q 15/00
[52] U.S. Cl. ........................................................ 342/7; 342/6
[58] Field of Search ........................................ 342/5, 6, 7

[56] References Cited

U.S. PATENT DOCUMENTS

| | | | |
|---|---|---|---|
| 3,417,398 | 4/1966 | Lewis et al. ............................... | 342/6 |
| 3,680,111 | 7/1972 | Killion et al. ............................ | 342/351 |
| 4,090,198 | 5/1978 | Canty et al.. ............................. | 342/6 |

FOREIGN PATENT DOCUMENTS

| | | | |
|---|---|---|---|
| 1107300 | 5/1961 | Germany ................................... | 342/6 |
| 0424263 | 9/1974 | U.S.S.R. ................................... | 342/6 |

Primary Examiner—Charles T. Jordan
Assistant Examiner—Christopher K. Montgomery
Attorney, Agent, or Firm—Mark M. Friedman

[57] ABSTRACT

An apparatus for use, for example, as a runway radar signal reflector, for reflecting incoming radar signals, which includes a reflector for reflecting the radar signals, a chamber through which the incoming signals pass on the way to the reflector, and a mechanism for periodically creating a plasma in the chamber so as to prevent the incoming radar signals from being reflected.

6 Claims, 1 Drawing Sheet

PULSING RADAR REFLECTOR

FIELD AND BACKGROUND OF THE INVENTION

The present invention relates to radar reflectors and, more particularly, to a radar reflector which can be pulsed to transmit information.

In a variety of applications, it is desirable to use reflectors which are sized and shaped to serve as effective radar signal reflectors. One common example of such applications is in the delineation of the edges of airport runways.

Aircraft landings are made under a variety of visibility conditions. When visibility is adequate, the pilot is able to visually see the actual runway during daylight landings, or, in the case of nighttime landings, the pilot is able to visually see the various lights delineating the runway which are available in many airports. The inclusion of the human pilot into the landing control loop is considered to be highly desirable, albeit not indispensable.

For decades it has been possible to execute safe landings even in very limited visibility or no visibility at all. Such instrument landings typically rely on a radar system and an altimeter to replace the pilot's eyes in providing information about the relative position of the aircraft and runway in guiding the aircraft to a safe landing. In one common system, radar signals transmitted by the aircraft are reflected from special reflectors typically mounted at regular intervals near the edges of the runway. The reflected signals are received by the aircraft, outlining the runway on the pilot's radar screen.

The reflectors may have any convenient shape which will effectively reflect a large fraction of the impinging radar signals back to the aircraft using a relatively small reflector. One such reflector which is currently in widespread use is the corner reflector which, in one form, is in the shape of a tetrahedron having three radar-reflecting triangular walls connecting each set of three apices except for one set which remains open or which is connected by a radar-transparent material. The reflector is mounted so that the side of the reflector not including a reflecting wall generally faces the oncoming aircraft.

A difficulty with the use of such radar reflectors is that, in some circumstances, the runway may lie in an area which offers a large number of unintended radar reflectors. As a result, the pilot may see on his radar screen a large number of dots, only some of which are the specially mounted reflectors, and may become confused as to the actual location of the runway. A related problem is caused when spurious signals or other noise appears on the radar screen. To reduce or overcome this difficulty it may be necessary to either to clear the areas in the vicinity of the runway of some or all of the unintended radar reflectors, upgrade the electronics of the aircraft's radar systems and/or use a relatively large number of reflectors, relatively closely spaced, so as to produce a very clear line of dots on the pilot's radar screen. Either option significantly raises the cost of the radar reflector system.

There is thus a widely recognized need for, and it would be highly advantageous to have, a radar reflector system, which includes radar reflectors which would effectively and clearly delineate a runway, even amidst various unintended radar reflectors in the vicinity and noisy radar reception and which would not necessitate the use of a large number of closely spaced reflectors.

SUMMARY OF THE INVENTION

According to the present invention there is provided an apparatus for reflecting incoming radar signals, comprising: (a) a reflector for reflecting the radar signals; (b) a chamber through which the incoming signals pass on the way to the reflector; and (c) means for periodically creating a plasma in the chamber so as to prevent the incoming radar signals from being reflected.

According to further features in preferred embodiments of the invention described below, the reflector is a corner reflector, such as in the form of a tetrahedron having three reflecting sides.

According to still further features in the described preferred embodiments the chamber is bounded by the three reflecting surfaces and by a fourth surface which is substantially transparent to radar signals and houses an inert or noble gas.

According to yet further features of an apparatus according to the present invention the means for periodically creating a plasma includes a source of high voltage pulses and further includes a timing means for regulating the rate of plasma creation which may be used to transmit coded messages through the apparatus.

According to another embodiment according to the present invention, there is provided a runway radar signal reflector for reflecting incoming radar signals from an aircraft back to the aircraft, comprising: (a) a reflector for reflecting the radar signals; (b) a chamber through which the incoming signals pass on the way from the aircraft to the reflector; and (c) means for periodically creating a plasma in the chamber so as to prevent the incoming radar signals from being reflected back to the aircraft.

The present invention successfully addresses the shortcomings of the presently known configurations by providing a radar signal reflector which can be pulsed, at a desirable rate or sequence, so as to supply information on the location of the reflector and/or other desired information, through the periodic creation of a plasma in a chamber located between the reflector surfaces and the source and detector of the radar signals.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a radar signal reflector which is particularly suitable for use in the effective delineation of an airport runway to facilitate instrument landings and takeoffs.

The principles and operation of a radar signal reflector according to the present invention are better understood with reference to the drawings and the accompanying description.

Figure 1:
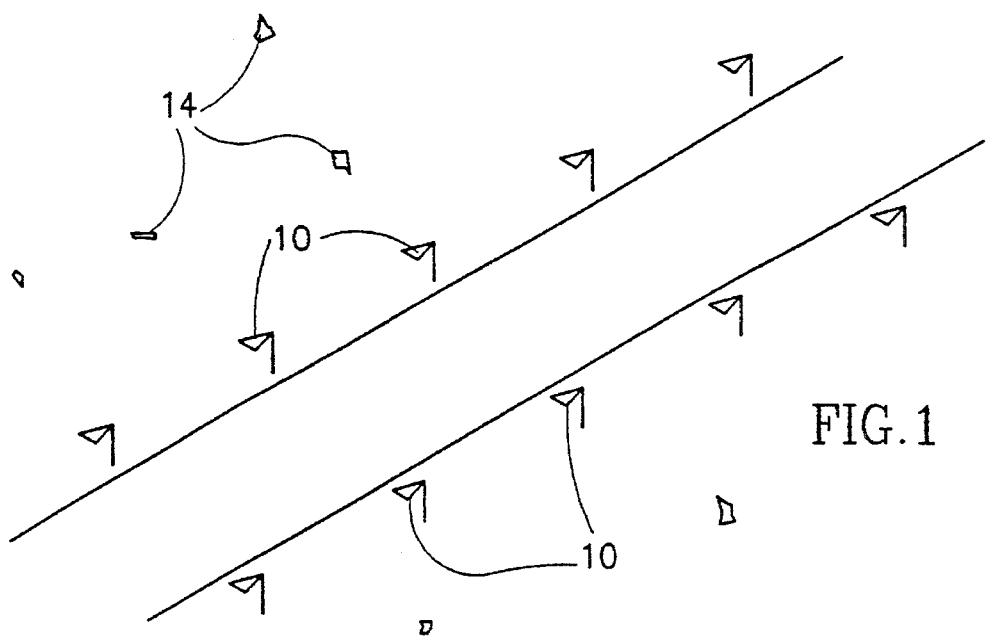
FIG. 1 is a perspective view of a typical runway equipped with reflectors to delineate the boundaries of the runway.

Referring now to the drawings, FIG. 1 illustrates a typical array of radar reflectors 10 commonly used to delineate the boundaries of a runway 12. Reflectors 10 shown in FIG. 1 may be conventional reflectors such as those in widespread use, or they may be pulsed reflectors according to the present invention. In addition, many airports also make use of a variety of separately mounted visible lights (not shown) to delineate the boundaries of runways and facilitate nighttime landings and landings in other reduced visibility conditions.

Figures 2, 3:
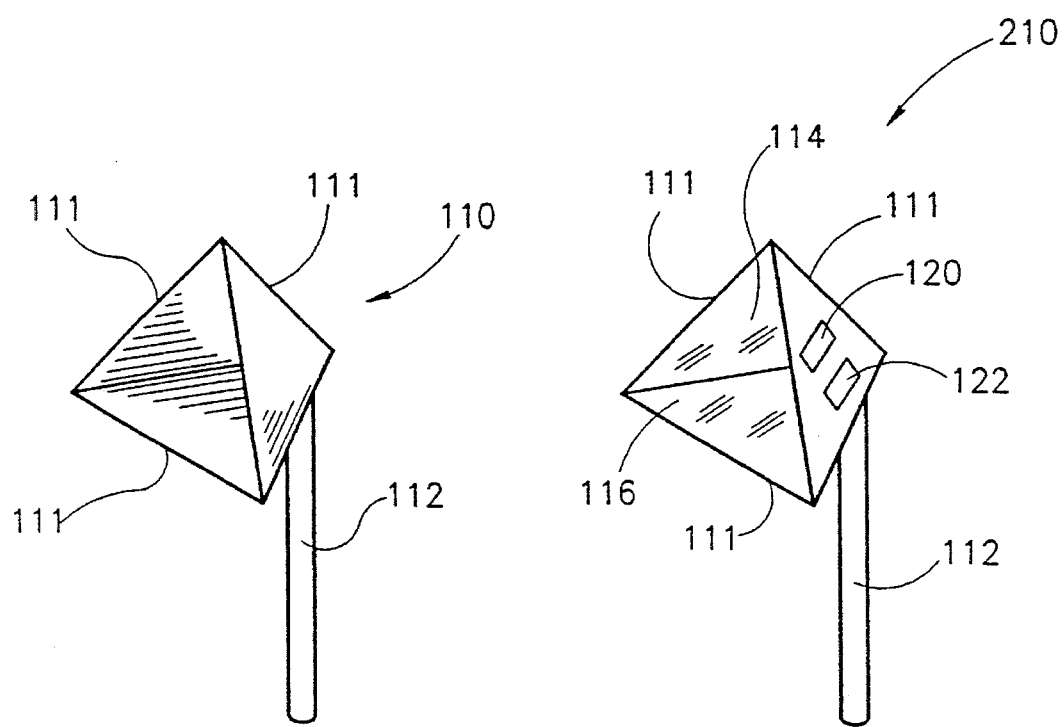
FIG. 2 is a close-up view of an example of a conventional radar signal reflector device.
FIG. 3 is a close-up view of one possible embodiment of a radar signal reflector device according to the present invention.

A typical conventional reflector 110 is shown in FIG. 2. Reflector 110 is known as a "corner reflector" and is typically in the form of a tetrahedron with three of four sides 111 made of a material, such as metal, which reflects radar signals, while the fourth side is typically left open. The size and shape of reflector 110 are selected to maximize the reflections and minimize the size and cost of the reflector. Each reflector 110 is typically mounted on a rod 112 anchored to the ground so as to place reflectors 110 at a desired height above the ground with the open face of the tetrahedron facing the direction of the source of radar signals.

In a conventional system, reflectors 110 are completely passive, having no moving parts and unconnected to any power supplies, and the like. Incoming radar signals from an aircraft are reflected back to the aircraft and show up on the aircraft's radar screen as a constant dot. A series of reflectors 110 are mounted (FIG. 1), preferably equally spaced, on each side of runway 12 so as to form substantially straight lines on the radar screen, thereby delineating runway 12 and facilitating instrument landing of the aircraft.

In some circumstances, additional and undesired radar reflections are obtained from various items in the vicinity of the runway, such as signs, rocks and equipment, designated generally as 14 in FIG. 1, or from spurious signals unrelated to any physical reflectors. In some cases, these unwanted reflections tend to obscure the representation on the radar screen of runway 12 and may lead to confusion as to its exact location. To avoid this problem, it may be necessary to clear the vicinity of the runway of undesired radar signal reflectors, to upgrade the electronics of the aircraft and/or to space the reflectors delineating the runway at very close intervals so as to form more well defined lines on the radar screen. All three of these options are expensive.

According to the present invention the effectiveness of a radar signal reflector of any design, including, but not limited to, conventional designs such as the corner reflector of FIG. 2, may be dramatically enhanced by causing the reflector periodically to not reflect incoming radar signals. Conventional radar signal reflectors reflect incoming signals continuously and without interruption, forming a constant dot on the aircraft's radar screen. By contrast, the reflecting function of a reflector 210 according to the present invention is interrupted at any desired fixed or variable time intervals or sequences for a desired duration so that the radar image of the reflector on the radar screen blinks or pulses, alternately appearing and disappearing, which greatly enhances its visibility and makes it possible to more easily visualize the runway even in the face of significant irrelevant radar reflections and even when the reflectors are spaced relatively far apart.

The blinking, or pulsing, of a reflector according to the present invention is accomplished through the periodic creation of a plasma in a chamber located in such a way that incoming signals must pass through the chamber on the way to the reflecting surfaces. For example, in the case of the corner reflector of FIGS. 2 and 3, such a chamber 114 may be conveniently created in the space defined by reflecting sides 111 and a fourth wall 116 which closes off the space and prevents gases from escaping from chamber 114.

Fourth wall 116 can be made of any suitable material provided that it is substantially transparent to radar signals. Thus, radar signals will be reflected from reflector 210 substantially as in the case of a conventional reflector 110 notwithstanding the presence of fourth wall 116.

Reflector 210 further includes means 120 for periodically creating a plasma in chamber 114. The presence of plasma in chamber 114 temporarily destroys the reflective properties of reflector 210 so as to prevent the incoming radar signals from being reflected. The result is that when plasma is found in chamber 114, no signals are received by the radar detector on the aircraft and the radar signature temporarily disappears from the screen.

A suitable plasma can be created in chamber 114 by a variety of means. Preferably, chamber 114 houses an inert or noble gas, such as neon, xenon, krypton or argon. Also included is a source of high voltage pulses.

In some applications, the system further includes a timing mechanism 122 and a control system, for regulating the frequency and duration of plasma creation so as to allow the reflector to transmit information beyond its mere location. Such information may be transmitted using various suitable codes.

Preferably, the formation of the plasma in chamber 114 produces visible light which is suitable for use as a visual indicator. Thus, use of a reflector according to the present invention obviates the need to install two separate systems for delineating the runway—one made up of conventional radar reflectors and one including visible lights. In a preferred reflector according the present invention both functions are fulfilled by a single device. During periods when a plasma is present, visible light is emitted but no radar reflection takes place, while during periods when no plasma is present, no visible light is emitted but there is effective radar reflection.

While the above description was limited to the application of the present invention in the context of the delineation of airport runways, it will be appreciated that many other applications are possible, all of which are intended to fall within the scope of the present invention. For example, a radar signal reflector according to the present invention may be used to send information in addition to, or in place of, indications of the position of the reflector.

In one application, the reflector may serve in place of, or in addition to, a lighthouse located on the beach, with the reflector being pulsed in a certain fixed sequence so as to identify to boats in the area not only the location of the reflector but also its identity, such as its code or name. Similar applications could also be envisioned in the context of ground vehicles.

In another application, variable messages relating, for example, to wind speed or other relevant information, could be transmitted through the pulsing sequence of the reflector, for example, using Morse code or other suitable codes.

While the invention has been described with respect to a limited number of embodiments, it will be appreciated that many variations, modifications and other applications of the invention may be made.

What is claimed is:

1. An apparatus for reflecting incoming radar signals, comprising:

(a) a corner reflector in the form of a tetrahedron having three reflecting sides for reflecting the radar signals;

(b) a chamber through which the incoming signals pass on the way to said reflector, said chamber being bounded by said three reflecting surfaces and by a fourth surface which is substantially transparent to radar signals; and (c) means for periodically creating a plasma in said chamber so as to prevent the incoming radar signals from being reflected.

2. An apparatus as in claim 1 wherein said chamber houses an inert gas and said means for periodically creating a plasma includes a source of high voltage pulses.

3. An apparatus as in claim 1 wherein said chamber houses a noble gas and said means for periodically creating a plasma includes a source of high voltage pulses.

4. An apparatus as in claim 1 wherein said means for periodically creating a plasma includes a timing means for regulating the rate of plasma creation.

5. An apparatus as in claim 4 wherein said timing means is controlled so as to transmit coded messages through the apparatus.

6. A runway radar signal reflector for reflecting incoming radar signals from an aircraft back to the aircraft, comprising:

(a) a corner reflector in the form of a tetrahedron having three reflecting sides for reflecting the radar signals;

(b) a chamber through which the incoming signals pass on the way from the aircraft to said reflector, said chamber being bounded by said three reflecting surfaces and by a fourth surface which is substantially transparent to radar signals; and (c) means for periodically creating a plasma in said chamber so as to prevent the incoming radar signals from being reflected back to the aircraft.

\* \* \* \* \*

UNITED STATES PATENT AND TRADEMARK OFFICE
CERTIFICATE OF CORRECTION

PATENT NO. : 5,459,468
DATED : October 17, 1995
INVENTOR(S) : Oren Hartal

It is certified that error appears in the above-indentified patent and that said Letters Patent is hereby corrected as shown below:

Column 4, line 66, replace "comer" with --corner--

Column 6, line 6, replace "comer" with --corner--

Signed and Sealed this

Twenty-third Day of January, 1996

Attest:

BRUCE LEHMAN

Attesting Officer

Commissioner of Patents and Trademarks